(12) United States Patent
Vieules et al.

(10) Patent No.: US 8,794,570 B2
(45) Date of Patent: Aug. 5, 2014

(54) PROTECTING DEVICE FOR AN AIRCRAFT EXTERIOR PROBE

(75) Inventors: Christophe Vieules, Toulouse (FR);
Xavier Outters, Toulouse (FR);
Philippe Mereau, Parisot (FR)

(73) Assignees: Airbus Operations S.A.S., Toulouse (FR); Airbus S.A.S., Blagnac (FR)

( * ) Notice: Subject to any disclaimer, the term of this patent is extended or adjusted under 35 U.S.C. 154(b) by 264 days.

(21) Appl. No.: 13/312,016

(22) Filed: Dec. 6, 2011

(65) Prior Publication Data
US 2012/0137798 A1 Jun. 7, 2012

(30) Foreign Application Priority Data

Dec. 6, 2010 (FR) ...................................... 10 60130

(51) Int. Cl.
*B64C 1/00* (2006.01)
*G01P 1/02* (2006.01)
*B64F 1/00* (2006.01)
*G01P 5/165* (2006.01)

(52) U.S. Cl.
CPC .................. *B64F 1/005* (2013.01); *G01P 1/026* (2013.01); *G01P 5/165* (2013.01)
USPC .......................................................... 244/121

(58) Field of Classification Search
None
See application file for complete search history.

(56) References Cited

U.S. PATENT DOCUMENTS

| 3,514,999 | A  | * | 6/1970 | Bagg et al. ................. 73/861.68 |
| 5,938,147 | A  |   | 8/1999 | DeGroff |
| 6,612,521 | B1 |   | 9/2003 | DeGroff |
| 6,901,793 | B1 | * | 6/2005 | Jefferson ........................ 73/182 |
| 7,175,344 | B2 | * | 2/2007 | D'Ouince et al. ............. 374/208 |
| 8,132,471 | B2 | * | 3/2012 | DeGroff et al. ............ 73/861.65 |
| 2010/0089147 | A1 | | 4/2010 | DeGroff et al. |

FOREIGN PATENT DOCUMENTS

| EP | 1 548 412 | 6/2005 |
| GB | 2 279 052 | 12/1994 |

OTHER PUBLICATIONS

French Search Report dated Aug. 25, 2011, corresponding to the Foreign Priority Application No. 10 60130.

* cited by examiner

*Primary Examiner* — Robert R Raevis
(74) *Attorney, Agent, or Firm* — Young & Thompson

(57) ABSTRACT

A device (10) for protection of an external probe (12) of an aircraft that projects through an opening (14) that is made in the outside surface (16) of the aircraft. The protective device (10) includes a rigid flange (22) for attachment to the outside surface (16) of the aircraft and a flexible envelope (24) for protection of the probe. The flange is attached by rapid attachment elements to the outside surface of the aircraft.

20 Claims, 1 Drawing Sheet

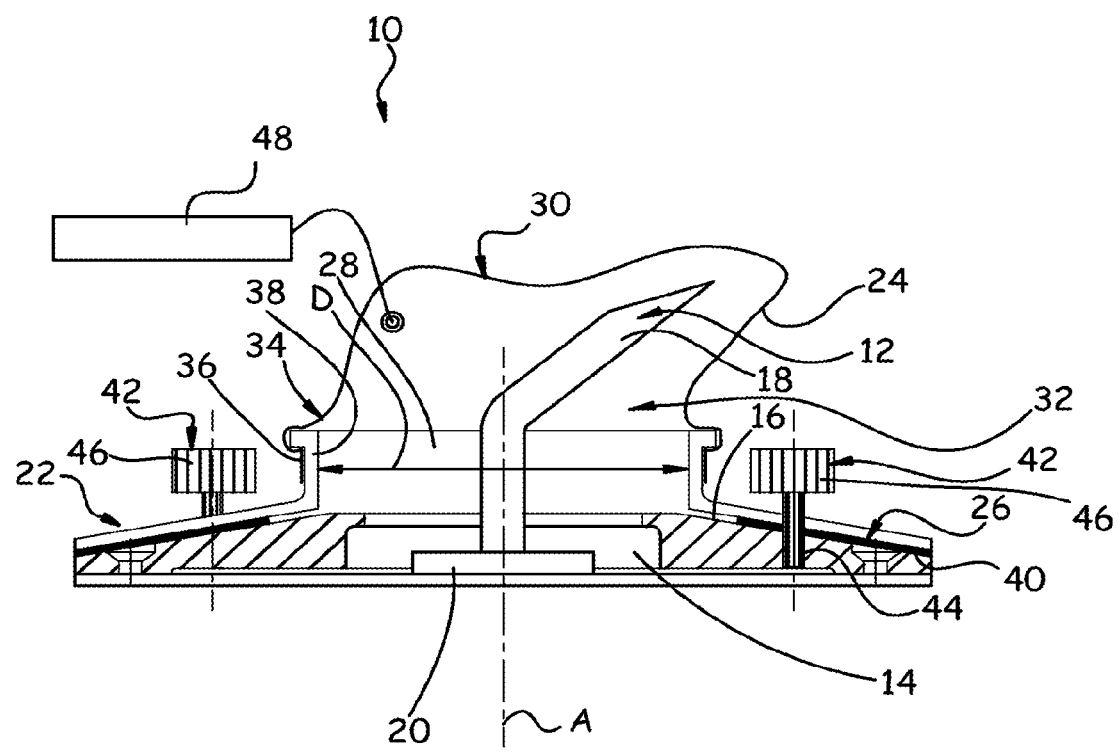

PROTECTING DEVICE FOR AN AIRCRAFT EXTERIOR PROBE

This invention relates to a device for protection of an external probe of an aircraft.

BACKGROUND OF THE INVENTION

An aircraft generally comprises different external probes arranged to project relative to the outside surface of said aircraft, whereby said probes make it possible to ascertain different information that is useful to the operation of the aircraft and/or to navigation.

When the aircraft is parked, these external probes should be protected from inclement weather.

Likewise, during washing and painting operations, said probes should be protected from different fluids that are used for these operations.

These protections are used only on the ground and are removed before take-off.

Also, different protective devices are known.

A first type of protection of the prior art comes in the form of a single envelope made of impregnated fabric that covers said probe.

This first type of protection does not make it possible to ensure an adequate seal.

A second type of protection of the prior art comes in the form of a rigid envelope, for example made of Nylon®, or semi-rigid, for example made of molded plastic.

Such a type of protection is described in the published application GB-2,279,052.

Also, so as to reduce the amount of space it requires, the shapes of the rigid or semi-rigid protection correspond to the external shapes of the probe.

A first drawback of this second type of rigid or semi-rigid protection is to require a careful assembly and disassembly to prevent the probe from being damaged.

According to a second drawback, each rigid or semi-rigid protection is dedicated to one probe in particular and cannot be interchanged from one probe to another.

The purpose of this invention is to eliminate the drawbacks of the prior art.

SUMMARY OF THE INVENTION

Thus, the invention has as its object a device for protection of an external probe of an aircraft that projects through an opening made in the outside surface of the aircraft, whereby said protective device comprises a rigid flange for attachment to the outside surface of the aircraft and a flexible envelope for protection of the probe.

This solution makes it possible to obtain a protective device that ensures an optimum seal, easy to install and to remove without running the risk of damaging the probe or the aircraft, easily identifiable and taking up a small amount of space so as to be able to be stored in a bag of limited size.

BRIEF DESCRIPTION OF THE DRAWING

Other characteristics and advantages will emerge from the following description of the invention, a description that is provided only by way of example, in relation to the single FIGURE that shows a cutaway view along a median plane of a protective device according to the invention, mounted on an external probe.

DETAILED DESCRIPTION OF THE PREFERRED EMBODIMENTS

As illustrated in the single FIGURE, the protective device 10 according to the invention is designed to equip an external probe 12 of an aircraft.

The probe 12 projects through an opening 14 that is made in the outside surface 16 of the aircraft.

As shown, the probe 12 comprises an outside part 18 that goes beyond the outside surface 16 and makes it necessary to be protected from inclement weather when the aircraft is parked and from various fluids during washing or painting operations, as well as an inside part 20 back from the outside surface 16 of the aircraft.

This outside part 18 can, for example, take the form of an inclined pipe in the case of a probe that is designed to measure pressure, for example.

Also, so as to protect the outside part 18 of the probe, the device 10 according to the invention comprises a rigid flange 22 for attachment to the outside surface 16 of the aircraft and a flexible protective envelope 24.

The flexible envelope 24 is made of an airtight material that is connected in an airtight manner to the flange 22.

The connection between the flange 22 and the outside surface 16 is equipped with sealing means 26, whereby the rigidity of the flange 22 ensures the quality of the seal achieved by the sealing means 26.

Thus, the flexible envelope 24 is made of a plasticized fabric or a flexible polymer material, while the flange 22 is made of a metal material or a polymer material that is optionally loaded with fibers.

Next, said flange 22 extends all around the base of the outside part 18 and comprises a broader central passage 28 than the outside part 18 so as to facilitate the installation of the protective device 10 on the probe and to prevent damaging the latter during the assembly or disassembly of the device.

The central passage 28 shown in the single figure is cylindrical along an axis A that is essentially perpendicular to the outside surface 16 of the aircraft and with a diameter D that is broader than the outside part 18 of the probe.

According to one variant, the passage 28 can be elliptical.

The flexible envelope 24 is sized in such a way as to be able to cover the longest and/or broadest models of external probes, and its flexibility makes it adaptable to numerous geometries that can be taken by the outside part 18 of the external probe.

Thus, a single device 10 according to the invention can be used for the protection of different models of probes.

According to another advantage, the flexibility of the envelope 24 improves the compactness of the protective device 10, in particular for the purpose of its storage in a bag of limited size or in a reduced space.

The envelope 24 is closed at its outside end 30 and opened by a mouth 32 at its inside end 34, whereby the edge 36 of the mouth 32 is connected in an airtight manner to the flange 22 all around the central passage 28.

The flexible envelope 24 can be connected in an airtight manner to the flange 22 according to different variants.

According to a first variant, the flange 22 comprises a collar 38 to which the edge 36 of the mouth 32 is connected, whereby the edge 36 is clamped on the collar by a clamp made of, for example, metal or plastic.

According to a second variant, the edge 36 of the mouth 32 is glued or welded to the rigid flange 22 all around the central passage 28.

According to a third variant, the edge 36 of the mouth 32 is clamped between the flange 22 and a counter-flange.

The sealing means 26 of the connection between said flange 22 and the outside surface 16 take the shape of a flat seal 40 inserted between the flange 22 and the outside surface of the aircraft.

According to different possible variants, the seal 40 is a foam seal, an elastomer seal, an O-ring, a lip seal, a fiber seal, or a metalloplastic seal.

So as to allow a rapid and easy installation, the device 10 comprises rapid attachment means 42 of the rigid flange 22 to the outside surface 16 of the aircraft.

As illustrated in the figure, these rapid attachment means 42 take the shape of bores 44 made in the outside surface 16, distributed around the opening 14 and accommodating interlocking parts 46.

These interlocking parts 46 can be optionally retractable ball spindles, bayonet spindles of the quarter-turn type, pins, screws or torque-limiting screws.

In addition, the interlocking parts 46 can also be equipped with torque nuts or a holding spring to ensure that the device 10 is held in position.

Combined with the rigidity of the flange 22 and that of the outside surface 16 of the aircraft, the rapid attachment means 42 make it possible to compress the sealing means 26 and thus contribute to the quality of the seal of the protection achieved by the device according to the invention.

In a general manner, it is noted that the seal is better ensured with the device according to this invention than with the devices of the prior art; consequently, the external probe 12 is better protected during inclement weather and cleaning or painting operations.

According to other advantages, the design of the device according to the invention makes it possible to optimize the mass relative to the provided functions, to optimize the unit cost relative to the provided functions, and to optimize the environmental footprint relative to the provided functions.

Finally, so as to indicate that it should be uninstalled before the aircraft takes off, this protective device can be equipped with a pennant 48 that alerts the tending or maintenance personnel to the fact that it needs to be removed.

The invention claimed is:

1. A device (10) for protection of an external probe (12) of an aircraft that projects through an opening (14) made in the outside surface (16) of the aircraft, said protective device (10) comprising:
    a rigid flange (22) with a top side, an opposite-facing bottom side that is reversibly attachable to the outside surface (16) of the aircraft, and a hole delimited by an interior portion of the flange (22), the hole forming a passage (28) that extends through from the bottom side to the top side the bottom side,
    a width (D) of the passage (28) being sufficient to permit the probe (12) to reversibly pass through the passage (28) upon attachment of the flange (22) to the outside surface (16) of the aircraft; and
    a flexible envelope (24) that attaches to the flange, a first portion of the flexible envelope configured to fit snugly to the flange and a second portion of the flexible envelope configured to enclose the probe within an interior of the flexible envelope for protection of the probe.

2. The device (10) according to claim 1, wherein the passage (28) is a central passage (28) of said flange (22), and the width (D) has sufficient size to accommodate an outside part (18) of said probe (12) that extends outward from the outside surface (16) of the aircraft.

3. The device (10) according to claim 2,
    wherein said flexible envelope (24) comprises an outside end (30) that is closed and an inside end (34) opened by a mouth (32), and
    wherein an edge (36) of the mouth (32) is connectable in an airtight manner to the flange (22) all around the central passage (28).

4. The device (10) according to claim 3, wherein the central passage (28) is cylindrical along an axis (A) that is perpendicular to the outside surface (16) of the aircraft and has a diameter (D) broader than the outside part (18) of the probe.

5. The device (10) according to claim 1, wherein said flexible envelope (24) is made of an airtight material.

6. The device (10) according to claim 5, further comprising:
    sealing means (26) formed of a flat seal (40) insertable betweenn the flange (22) and the outside surface (1) of the aircraft.

7. The device (10) according to claim 1, further comprising:
    rapid attachment means (42) attaching the rigid flange (22) to the outside surface (16) of the aircraft.

8. The device (10) according to claim 7, wherein the rapid attachment means (42) comprises interlocking parts (46) configured to be accommodated within bores (44) made in the outside surface (16) and distributed around the opening (14).

9. The device (10) according to claim 2, in which said flexible envelope (24) is made of an airtight material.

10. The device (10) according to claim 3, in which said flexible envelope (24) is made of an airtight material.

11. The device (10) according to claim 4, in which said flexible envelope (24) is made of an airtight material.

12. The device (10) according to claim 2, further comprising:
    rapid attachment means (42) for attaching the rigid flange (22) to the outside surface (16) of the aircraft.

13. The device (10) according to claim 3, further comprising:
    rapid attachment means (42) for attaching the rigid flange (22) to the outside surface (16) of the aircraft.

14. The device (10) according to claim 4, further comprising:
    rapid attachment means (42) for attaching the rigid flange (22) to the outisde surface (16) of the aircraft.

15. The device (10) according to claim 5, further comprising:
    rapid attachment means (42) for attaching the rigid flange (22) to the outside surface (16) of the aircraft.

16. The device (10) according to claim 6, further comprising:
    rapid attachment means (42) for attaching the ridgid flange (22) to the outside surface (16) of the aircraft.

17. The device (10) according to claim 1,
    wherein said flexible envelope (24) comprises an outside end (30) that is closed and an inside end (34) opened by a mouth (32), and
    wherein an edge (36) of the mouth (32) is connectable in an airtight manner to the flange (22) around the passage (28).

18. The device (10) according to claim 17,
    wherein the top side of the rigid flange (22) comprises a collar (38) surrounding a top-most portion of the passage (28), an inner surface of the collar forming a portion of the inner side wall, and an outer surface of the collar extending at an angle from a top surface of the rigid flange (22), and wherein an edge of the mouth (32) of the flexible envelope (24) is configured to fit over the collar and form an airtight seal against the outer surface collar.

19. The device (10) according to claim 1, wherein the first portion of the flexible envelope forms a mouth that is welded to a top surface of the rigid flange (22) surrounding the passage (28).

20. The device (10) according to claim 1, wherein the passage (28) is delimited by an inner side wall of the flange (22) extending through from a bottom side of the flange to a top-most surface of the flange that permits the probe (12), when the flange (22) is attached to the outside surface (16) of the aircraft, to extend through the bottom side of the flange and past the top-most surface of the flange (22) so as to be exposed above a top-most extent of the inner side wall of the central passage (28).

* * * * *